(12) United States Patent
Sivertsen

(10) Patent No.: US 7,487,283 B2
(45) Date of Patent: Feb. 3, 2009

(54) APPARATUS FOR BRIDGING TWO OR MORE DATA COMMUNICATIONS INTERFACES

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 118 days.

(21) Appl. No.: 10/222,267

(22) Filed: Aug. 16, 2002

(65) Prior Publication Data
US 2004/0034731 A1 Feb. 19, 2004

(51) Int. Cl.
G06F 13/00 (2006.01)
G06F 13/36 (2006.01)
H05K 7/10 (2006.01)

(52) U.S. Cl. .......... 710/306; 710/301; 710/303

(58) Field of Classification Search ......... 710/301–306, 710/311, 313, 315; 361/683–686, 728; 711/114
See application file for complete search history.

(56) References Cited

U.S. PATENT DOCUMENTS

| | | | |
|---|---|---|---|
| 4,858,070 A * | 8/1989 | Buron et al. | 361/695 |
| 5,227,957 A * | 7/1993 | Deters | 361/686 |
| 5,313,626 A | 5/1994 | Jones et al. | |
| 5,317,697 A | 5/1994 | Husak et al. | |
| 5,331,509 A * | 7/1994 | Kikinis | 361/686 |
| 5,460,441 A * | 10/1995 | Hastings et al. | 312/298 |
| 5,579,491 A | 11/1996 | Jeffries et al. | |
| 5,608,608 A * | 3/1997 | Flint et al. | 361/686 |
| 5,666,497 A | 9/1997 | Milhaupt et al. | |
| 5,761,033 A * | 6/1998 | Wilhelm | 361/686 |
| 5,787,246 A | 7/1998 | Lichtman et al. | |
| 5,815,647 A | 9/1998 | Buckland et al. | |
| 5,822,782 A | 10/1998 | Humlicek et al. | |
| 5,867,733 A | 2/1999 | Meyer | |
| 5,898,891 A | 4/1999 | Meyer | |
| 5,920,709 A | 7/1999 | Hartung et al. | |
| 5,941,963 A * | 8/1999 | Charles et al. | 710/62 |

(Continued)

OTHER PUBLICATIONS

"Fibre Channel-Arbitrated Loop". The Free On-Line Dictionary of Computing. Online Sep. 12, 1999, Retrieved from Internet Oct. 6, 2004. <http://foldoc.doc.ic.ac.uk/foldoc/foldoc.cgi?Fibre+Channel-Arbitrated+Loop>.*

(Continued)

*Primary Examiner*—Mark Rinehart
*Assistant Examiner*—Thomas J Cleary
(74) *Attorney, Agent, or Firm*—Hope Baldauff Hartman, LLC

(57) ABSTRACT

An apparatus is provided for bridging two or more data communications interfaces. The apparatus includes a powered enclosure for receiving and powering one or more storage devices and one or more computing devices and provides a first data communications interface connecting the one or more storage devices to the one or more computing devices. One or more computing devices are also provided for use within the enclosure, each device comprising a controller for communicating with the one or more storage devices via the communications interface provided by the powered enclosure. The computing devices also include a controller for enabling communications via second data communications interface, and a bridging component for providing a bridge between the interface provided by the enclosure and the second interface. The second interface may be connected to an external bus or an external network.

15 Claims, 8 Drawing Sheets

U.S. PATENT DOCUMENTS

| | | | | |
|---|---|---|---|---|
| 5,943,505 | A | * | 8/1999 | Lumpkin et al. ............... 710/31 |
| 6,018,456 | A | * | 1/2000 | Young et al. ................. 361/684 |
| 6,038,624 | A | | 3/2000 | Chan et al. |
| 6,070,207 | A | | 5/2000 | Bell |
| 6,131,134 | A | * | 10/2000 | Huang et al. ................ 710/302 |
| 6,145,029 | A | | 11/2000 | Deschepper et al. |
| 6,507,882 | B1 | * | 1/2003 | Golka et al. ................. 710/302 |
| 6,516,374 | B1 | | 2/2003 | Kinoshita et al. |
| 6,526,515 | B1 | * | 2/2003 | Charles et al. .............. 713/300 |
| 6,560,099 | B1 | * | 5/2003 | Chang ......................... 361/685 |
| 6,563,700 | B1 | * | 5/2003 | Waller et al. ................ 361/683 |
| 6,594,721 | B1 | | 7/2003 | Sakarda et al. |
| 6,639,792 | B1 | | 10/2003 | Chang |
| 6,654,842 | B1 | | 11/2003 | Park |
| 6,654,843 | B1 | | 11/2003 | Wakeley et al. |
| 6,742,068 | B2 | | 5/2004 | Gallagher et al. |
| 6,743,054 | B2 | | 6/2004 | Wu |
| 7,096,300 | B2 | | 8/2006 | Sivertsen |
| 7,159,063 | B2 | | 1/2007 | Sivertsen |
| 2001/0008006 | A1 | * | 7/2001 | Klein ......................... 711/105 |
| 2002/0083349 | A1 | * | 6/2002 | Khatri et al. ................. 713/300 |
| 2002/0099898 | A1 | * | 7/2002 | Oliphant ..................... 710/306 |
| 2002/0194412 | A1 | * | 12/2002 | Bottom ....................... 710/302 |
| 2002/0199048 | A1 | * | 12/2002 | Rabinovitz .................. 710/100 |
| 2003/0032333 | A1 | * | 2/2003 | Kwong ....................... 439/638 |
| 2003/0145045 | A1 | * | 7/2003 | Pellegrino et al. ........... 709/203 |

OTHER PUBLICATIONS

"iSCSI". The Whatis.com IT-Specific Encyclopedia. Online Jun. 20, 2001. Archived Aug. 5, 2001. Retrieved from Internet Oct. 6, 2004. <http://web.archive.org/web/20010805020510/http://whatis.techtarget.com/ definition/0.,sid9_gci750136,00.html>.*

"exposed". Random House Unabridged Dictionary, 1997. Random House, Inc., on Infoplease. Retrieved from Internet Apr. 25, 2006. <http://www.infoplease.com/dictionary/exposed>.*

'High Performance Serial Bus', The Free On-Line Dictionary of Computing. Online Sep. 3, 2000. Retrieved from Internet Aug. 28, 2006. <http://foldoc.org/foldoc.cgi?query=firewire>.*

'Small Computer System Interface'. The Free On-Line Dictionary of Computing. Online Mar. 30, 1999. Retrieved from Internet Aug. 28, 2006. <http://foldoc.org/foldoc.cgi?query=scsi>.*

"bay". The Free On-Line Dictionary of Computing. Online Jan. 11, 1999. Retrieved from Internet Jan. 25, 2007. <http://foldoc.org/index.cgi?query=bay>.*

"High Performance Serial Bus". The Free On-Line Dictionary of Computing. Online Sep. 3, 1999, Retrieved from Internet Jan. 25, 2007. <http://foldoc.org/?Firewire>.*

Addonics Technologies, "Addonics IDE to SCSI Model: ADAEC7726H," http://www.addonics.com.

Conner Peripherals, Inc. and Intel Corporation, *SCSI Accessed Fault-Tolerant Enclosures Interface Specification Revision 1.00*, Oct. 17, 1995.

David Landis and William Check, "An Analysis of Queuing Strategies for SCA Data Broadcast Systems," Mar. 1998, *IEEE Transactions On Broadcasting*, vol. 34, No. 1.

KRI Computer, 1U 4X/8X AGP Raiser With Extension Card, http://www.servercase.com.

Winchester Electronics, "SCA-2 Single Connector Attachment", printed Oct. 17, 2005, http://www.winchesterelectronics.com/products.sca2/sca2.asp.

* cited by examiner

APPARATUS FOR BRIDGING TWO OR MORE DATA COMMUNICATIONS INTERFACES

TECHNICAL FIELD

Embodiments of the invention generally relate to the field of data storage and, more particularly, to the field of bridging data communications interfaces.

BACKGROUND OF THE INVENTION

With the advent and explosion of the Internet and the World Wide Web, there has come a similar explosion in the demand for data storage solutions. To address this demand, large data centers typically employ rack mount cabinets filled with hard disk drives. One typical implementation for providing network access to a large number of hard disk drives is shown in FIG. 1. As shown in FIG. 1, a typical architecture for providing network-attached storage involves two components. The first component is a rack mount enclosure 2. The enclosure 2 houses a server computer 28 that receives and responds to requests for data stored on the hard disks 18A-18D, stored in the rack mount enclosure 4.

According to a typical implementation, the computer 28 comprises a motherboard 22 containing conventional computing components such as a disk adapter 24 for controlling the hard disk drives 18A-18D, and a local area network ("LAN") adaptor 26 for establishing communications with the network 26. The computer 28 may additionally include a local hard disk drive 18E.

The LAN adaptor 25 communicates with storage clients 30A-30C through the network 26. The network 26 may include a hub 27, a router, or other conventional networking components. Through the network 26, the storage clients 30A-30C can request access to data stored on the hard disk drives 18A-18D from the computer 28. The computer 28 can respond to the request from the storage clients 30A-30C by retrieving data from the hard disk drives 18A-18D and providing the data to the requesting storage client through the network 26.

In a typical implementation, the hard disk drives 18A-18D are stored in a 3-unit rack mount enclosure 4. The enclosure 4 includes space for one or more enclosures 12 which may include one or more mass storage devices 6A-6E, a fan 8 or a power supply 10. The computer 28 is typically connected to the enclosure 4 through the use of a connector cable 20. In the typical implementation shown in FIG. 1, a total of four units of rack space are required.

While the conventional architecture for a network attached storage server shown in FIG. 1 does provide the ability for the storage clients 30A-30C to access the hard disk drives 18A-18D, this architecture is not without drawbacks. In particular, in order to provide access to hard disk drives 18A-18D, an enclosure 2 is needed for the computer 28. As mentioned above, the enclosure 2 occupies at least one unit of rack space.

Because the number of rack spaces within a rack mount cabinet is limited, it is highly desirable to reduce the number of rack spaces utilized to store the server computers 28. Therefore, it would be advantageous if an architecture could be provided for accessing mass storage devices that does not require a dedicated rack space for a server computer. Moreover, although the architecture shown in FIG. 1 provides a conventional interface from the network 26 to the hard disk drives 18A-18D, the illustrated architecture is not easily configured to provide a bridge between other types of interfaces and the hard disk drives 18A-18D. Therefore, there is a need for an apparatus that can easily provide a bridge between an external communications interface and the hard disk drives 18A-18D, regardless of the data communications interface utilized to connect the hard disk drives 18A-18D.

SUMMARY OF THE INVENTION

Embodiments of the present invention solve the above-described problems by providing a server apparatus that allows network access to any number of mass storage devices without requiring a separate enclosure for a server computer. Moreover, embodiments of the invention provide an apparatus that allows a bridge to be created between two or more data communications interfaces, including an interface to one or more mass storage devices.

Generally described, one embodiment of the invention provides an apparatus for providing a bridge between two or more data communications interfaces. In particular, an apparatus is provided that includes a powered enclosure for receiving and powering one or more storage devices and one more computing devices. The enclosure also provides a data communications interface connecting the one or more storage devices to the one or more computing devices. Computing devices and storage devices may be hot-swapped into and out of the enclosure.

According to one embodiment of the invention, a computing device is also provided for use within the enclosure that includes a controller for communicating with one or more storage devices via the communications interface provided by the powered enclosure. The computing device also includes a second controller for enabling communications via a second communications interface. In particular, an external communications interface may be utilized for communicating via a bus interface or a network interface. According to this embodiment of the invention, the computing device also includes a bridging component for providing a bridge between the interface provided by the powered enclosure and the interface to the external bus or network.

According to another embodiment of the invention, a bridge apparatus is provided that includes a powered enclosure having one or more bays. Each of the bays may receive and power either a storage device or a computing device. The powered enclosure includes a backplane having connectors for mating with the storage devices and the computing devices. The backplane also has a local bus between the connectors that provides a bus connection between the storage devices and the computing devices. The enclosure also includes a power supply for providing power to storage devices and computing devices inserted in each bay. According to various embodiments of the invention, the storage devices and the computing devices may be similarly sized in one and one-half inch, two and one-half inch, and three and one-half inch bays within the enclosure. Moreover, the storage devices and computing devices may be inserted into the enclosure and removed from the enclosure while power remains applied to the enclosure.

According to one embodiment of the invention, a computing device is also provided for use within the enclosure. The computing device includes a local bus interface controller for communicating over the backplane with the storage devices. The computing device also includes a secondary interface controller for communicating via an external bus or an external network. The computing device also includes a dedicated bridge component for bridging communications between the local bus provided by the backplane and the external bus or external network.

Additional details regarding the various embodiments of the present invention will become apparent from the detailed description that follows.

DETAILED DESCRIPTION OF AN ILLUSTRATIVE EMBODIMENT

As described briefly above, embodiments of the present invention provide an apparatus for bridging two or more data communications interfaces. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined only by the appended claims and their equivalents.

Figure 1:
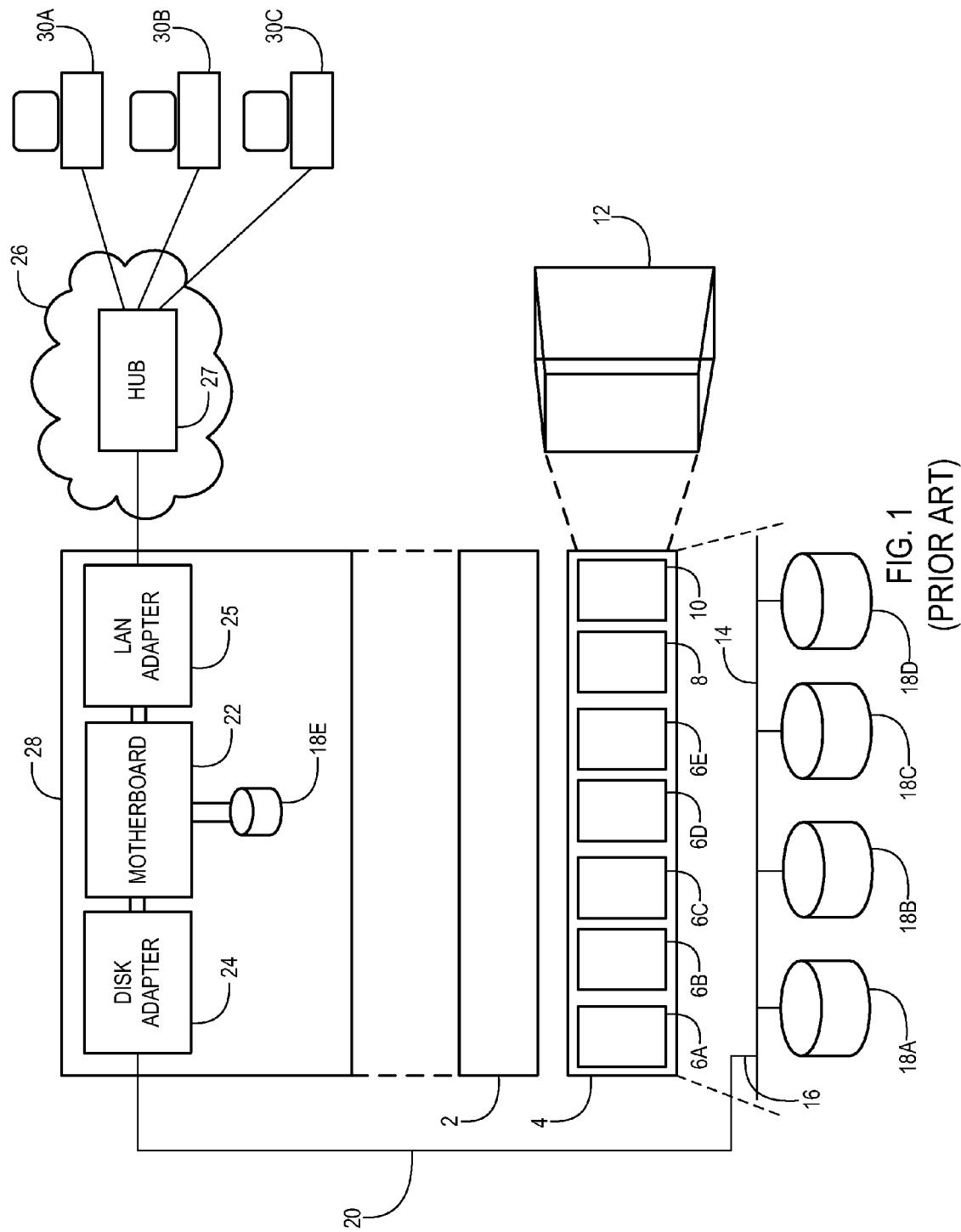
FIG. 1 is a computer architecture diagram showing a conventional computer architecture for providing network access to mass storage devices.
Figure 2:
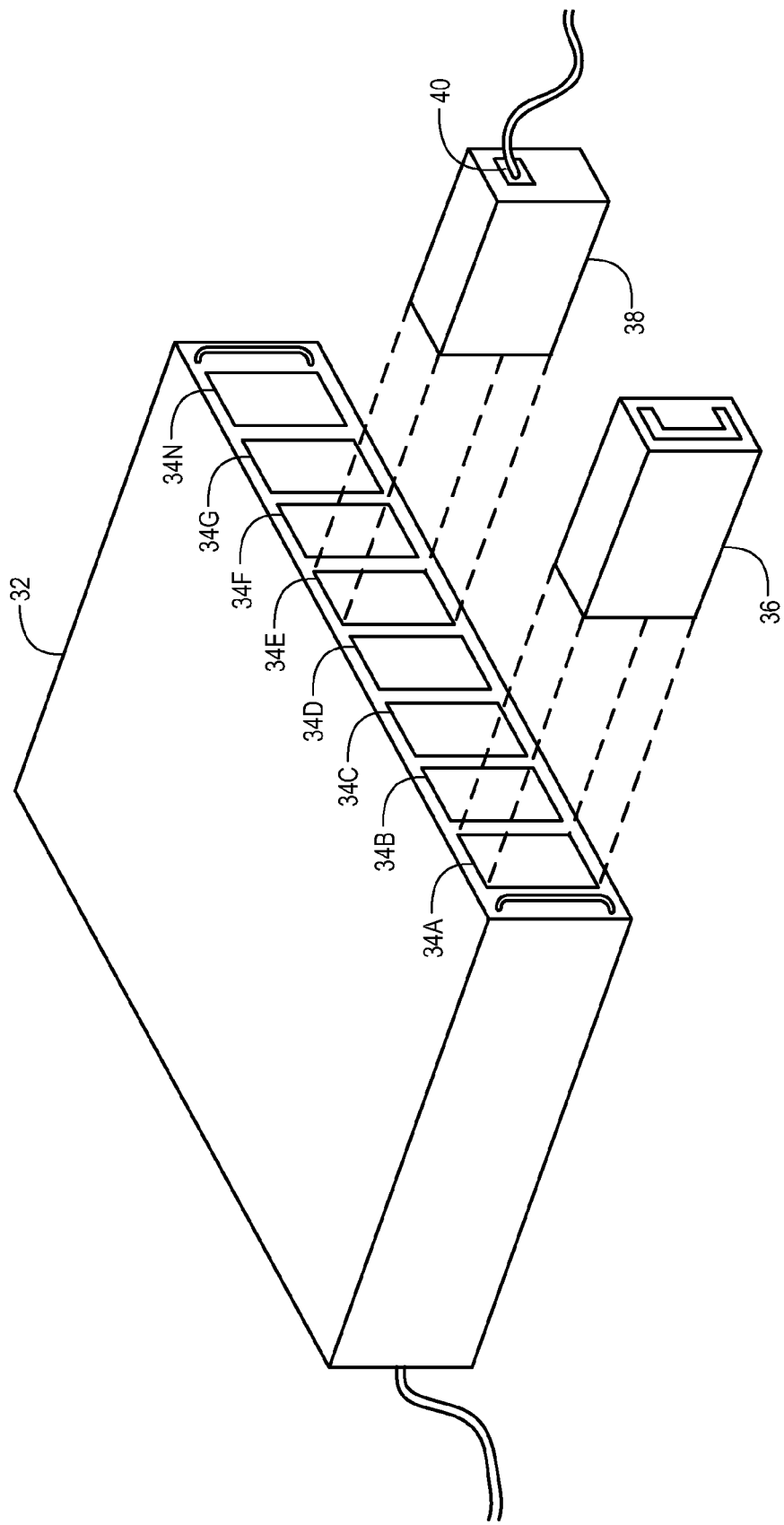
FIG. 2 is a perspective diagram showing a powered enclosure, a storage device, and a computing device provided according to one actual embodiment of the present invention.

Referring now to FIG. 2, various aspects of a powered enclosure 32 provided according to one embodiment of the present invention will be described. As shown in FIG. 2, a powered enclosure 32 is provided that is capable of being rack-mounted in a standard rack mount cabinet. The powered enclosure 32 includes a number of bays 34A-34N. The bays 34A-34N are each operative to receive a storage device 36 or a computing device 38. Additionally, the bays 34A-34N may also be operative to receive a fan or a power supply (not shown).

According to one embodiment of the invention, the bays 34A-34N are configured according to a standard form factor. In particular, according to one embodiment of the invention, the bays 34A-34N are configured according to a three and one-half inch form factor. Correspondingly, the storage device 36 and the computing device 38 are also configured according to the three and one-half inch form factor. In other embodiments, however, the bays 34A-34N, the storage device 36, and the computing device 38 may be configured to either a one and one-half inch or a two and one-half inch form factor.

As will be described in greater detail below, when power is applied to the enclosure 32, power is also applied to the storage devices 36 and computing devices 38 mounted within the bays 34A-34N. As will also be described in greater detail below, according to one embodiment of the invention, the computing device 38 includes a connector 40 for an external bus or an external network. The connector 40 is positioned in a manner to make it accessible when the computing device 38 is inserted into the enclosure 32. Additional details regarding the types of external buses and external networks that may be connected to the computing device 38 according to the various embodiments of the invention will be described in greater detail below.

Figure 3A:
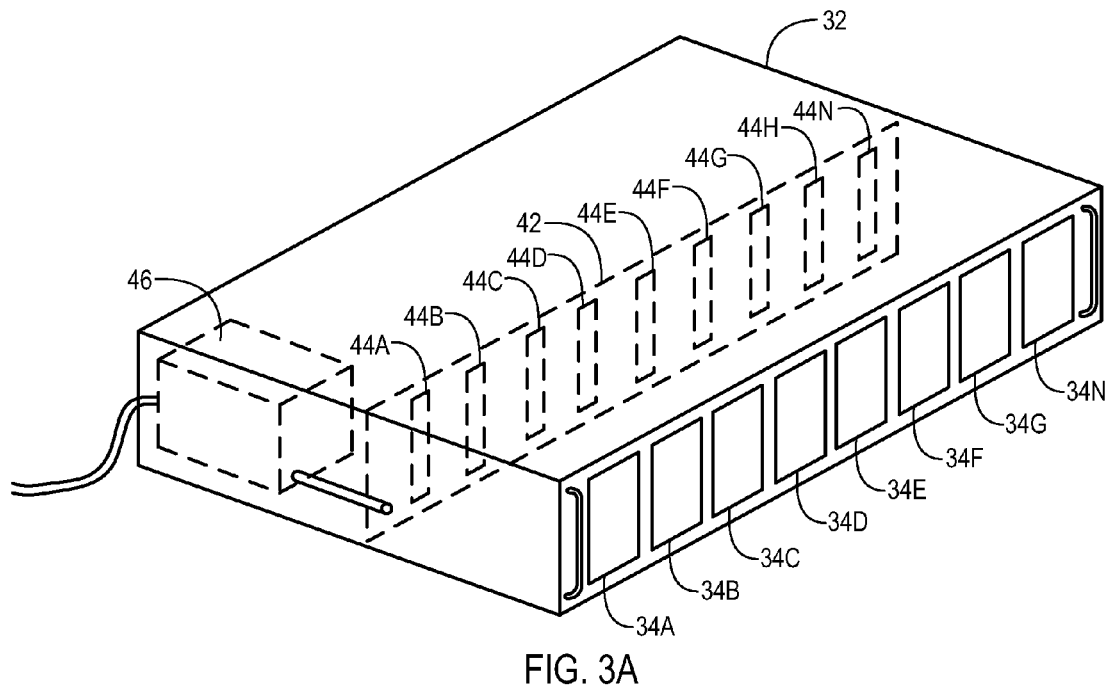
FIG. 3A is a perspective diagram showing various aspects of a powered enclosure provided according to one embodiment of the present invention.

Referring now to FIG. 3A, additional aspects of a powered enclosure 32 provided according to the various embodiments of the present invention will be described. As shown in FIG. 3A, and as described briefly above, the powered enclosure 32 includes one or more bays 34A-34N for receiving storage devices, computing devices, or fans. In order to provide electrical power to these storage devices, computing devices, and fans, a power supply 46 is provided. Alternatively, a power supply sized and compatible with one of the bays 34A-34N may also be utilized. In order to provide power to each of the bays 34A-34N, a backplane 42 is provided. The backplane 42 distributes power to each of the devices mounted within the bays 34A-34N. Additionally, the backplane 42 also includes a local bus 48. The local bus 48 electrically connects one or more connectors 44A-44N. In this manner, when a storage device or computing device is mounted within one of the bays 34A-34N, the mounted device will be electrically connected via the local bus 48 to other devices mounted within other bays.

According to one embodiment of the invention, the connectors 44A-44N and the bus 48 are configured in such a manner as to allow the hot swapping of storage devices and computing devices into the powered enclosure 32. One method of providing such capability is described in U.S. Pat. No. 7,007,109, which is expressly incorporated herein by reference. Additional connector types and bus interfaces known to those skilled in the art may also be utilized to enable the hot plugging of storage devices and computing devices onto the backplane 42. Aspects of the communication between the storage devices and computing devices as disclosed by U.S. Pat. No. 7,007,109 will be discussed below with respect to FIG. 8.

Figure 3B:
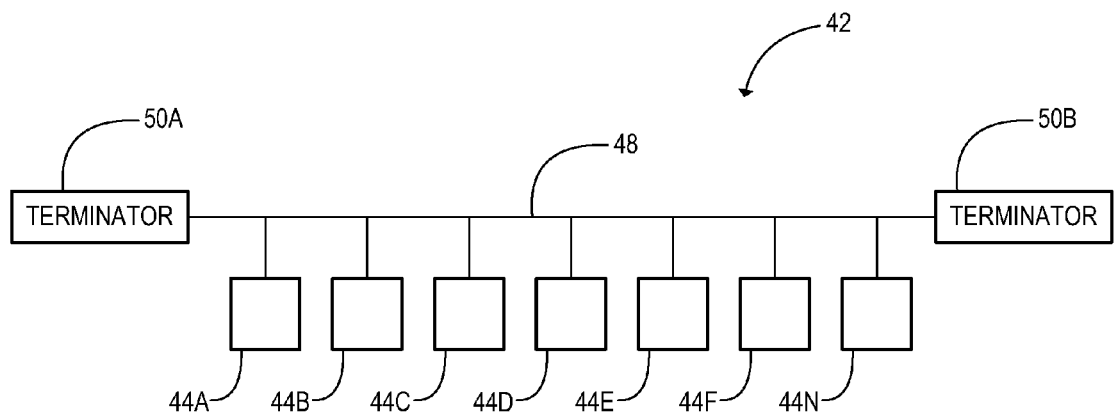
FIG. 3B is a computer architecture diagram showing additional aspects of a powered enclosure provided according to one embodiment of the present invention.

Turning now to FIG. 3B, additional aspects of the backplane 42 provided according to one embodiment of the present invention will be described. As shown in FIG. 3B, the backplane 42 comprises a local bus 48. Connected to the local bus 48 are one or more connectors 44A-44N that provide data and power connections to devices mounted within the powered enclosure 32. Additionally, the backplane 42 includes terminators 50A and 50B for terminating each end of the bus 48.

According to the various embodiments of the present invention, the local bus 48 may support a data communications interface such as the small computer systems interface ("SCSI") known to those skilled in the art. Alternatively, the bus 48 may support a fibre channel interface, an Advanced Technology Attachment ("ATA") interface, or a serial-ATA interface, also known to those skilled in the art. It should be appreciated that the term ATA as referred to herein includes the parallel-ATA and integrated drive electronics ("IDE") interfaces. Other types of data communications interfaces may also be utilized in various other implementations of the local bus 48.

Figure 4A:
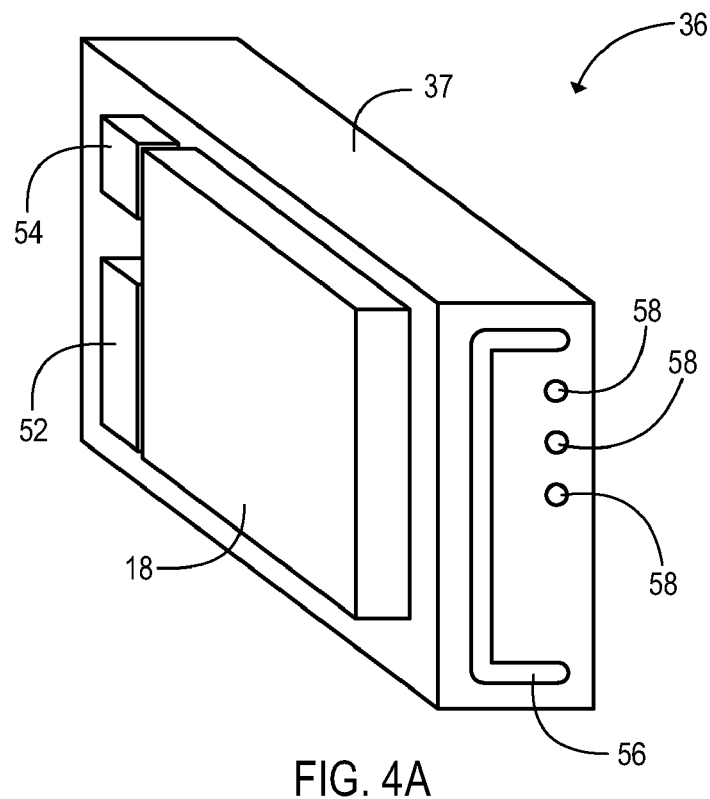
FIGS. 4A and 4B are perspective diagrams showing various aspects of a storage device and a computing device provided according to various embodiments of the present invention, respectively.

Turning now to FIG. 4A, various aspects of a storage device 36 provided according to the various embodiments of the present invention will be described. As shown in FIG. 4A, the storage device 36 includes an enclosure 37 for mounting one or more mass storage devices. In the embodiment shown in FIG. 4A, a single hard disk drive 18 is mounted within the enclosure 37. A data connector 52 and a power connector 54 of the hard disk drive 18 are exposed from the rear of the enclosure 37 so that they may mate with the appropriate one of the connectors 44A-44N when the storage device 36 is mounted within the enclosure 32. Additionally, the enclosure 37 includes a handle 56 for securing the storage device within the enclosure 32 and one or more indicator lights 58 for providing the status of the hard disk drive 18.

Figure 4B:
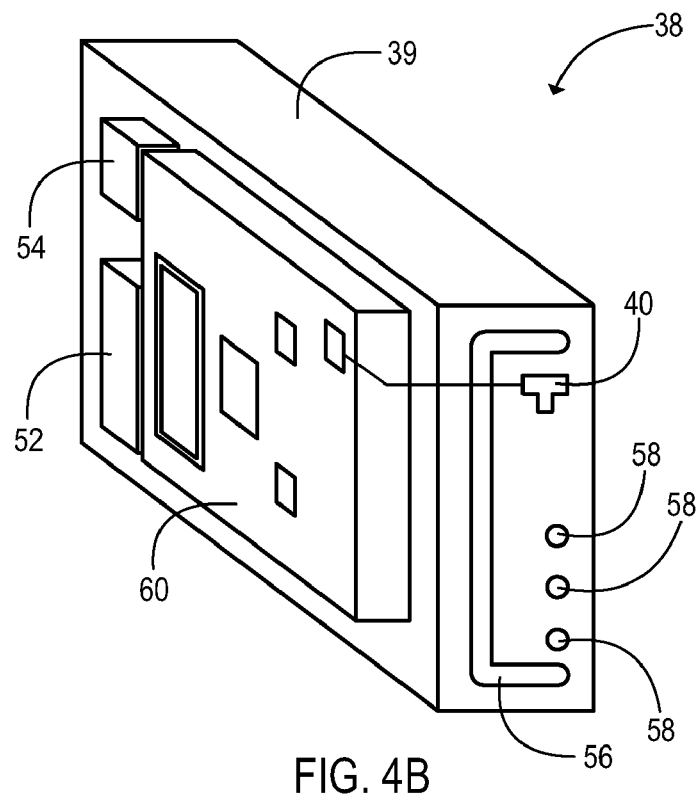

Referring now to FIG. 4B, various aspects of a computing device 38 provided according to embodiments of the present invention will be described. As shown in FIG. 4B, the computing device 38 comprises an enclosure 39 for mounting a circuit board 60. Alternatively, the circuit board 60 may be provided without an enclosure 39. In this embodiment, the circuit board 60 may simply be provided with rails for mounting the computing device 38 within the enclosure 32.

The circuit board 60 includes a data connector 52 and a power connector 54 compatible with the connectors 44A-44N. In this manner, when the computing device 38 is mounted within one of the bays 34A-34N of the enclosure 32, the computing device will receive power through the connector 54 and will be electrically connected to the bus 48 through the connector 52.

The circuit board 60 is also electrically connected to an external connector 40. As will be described in greater detail below, the external connector 40 provides an interface to an external bus or network. As with the storage device 36, the computing device 38 includes a handle 56 for securing the computing device 38 within the enclosure 32 and one or more indicator lights 58 for providing the status of the computing device 38. Additional details regarding computer architectures for various embodiments of the computing device 38 will be described in greater detail below with reference to FIGS. 5-7.

Figure 5:
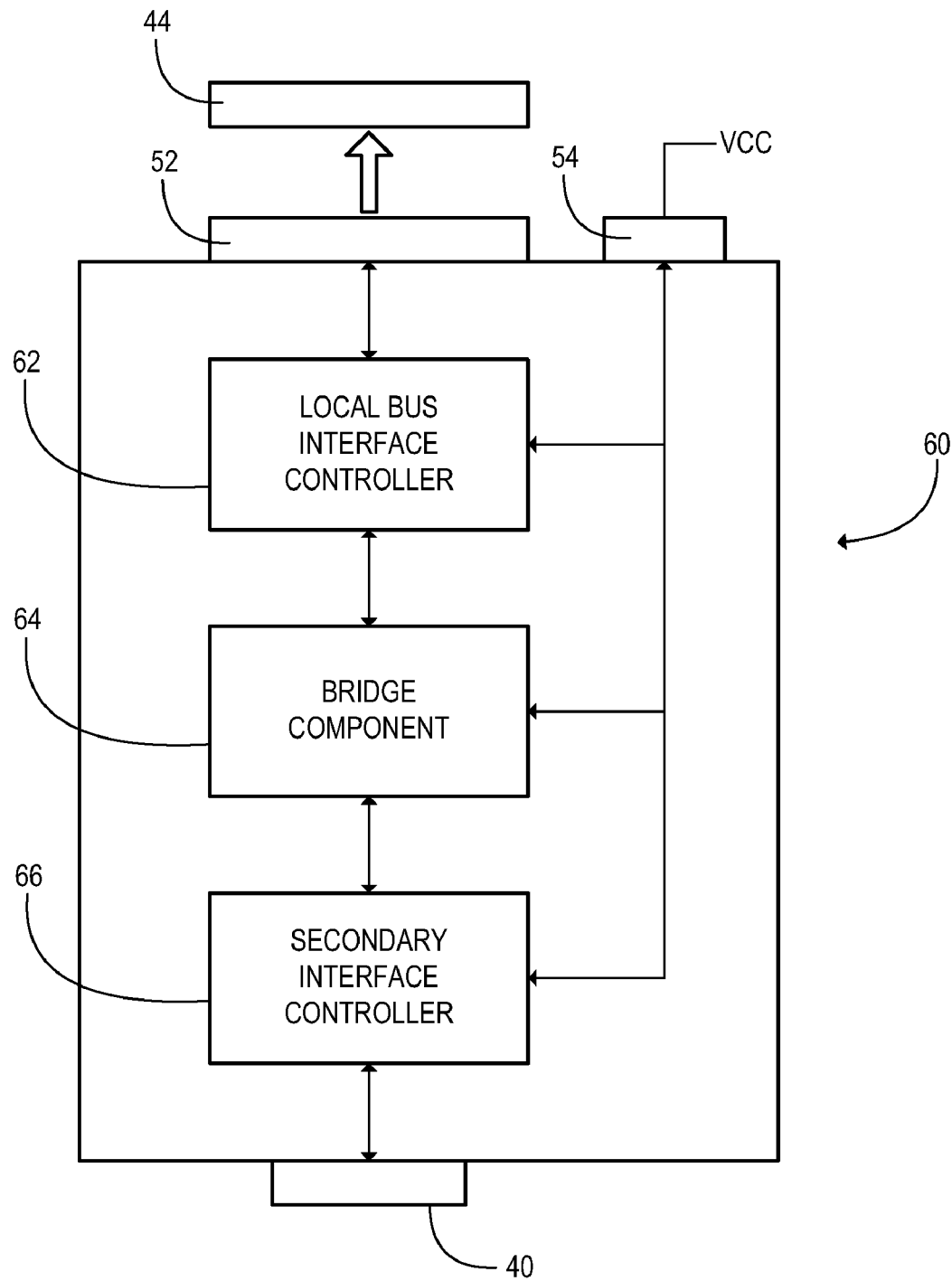
FIG. 5 is a computer architecture diagram showing an illustrative computer architecture for a computing device provided according to one embodiment of the present invention.

Referring now to FIG. 5, additional aspects of a circuit board 60 utilized in the computing device 38 will be described. As shown in FIG. 5, the circuit board 60 includes a data connector 52 for mating with the connector 44 located on the backplane 42. The circuit board 54 also includes a power connector 54 for mating with a power connector on the backplane 42. Alternatively, the connectors 52 and 54 may be combined into a single connector for simultaneously mating both data and power signals.

According to the various embodiments of the present invention, the circuit board 60 includes a local bus interface controller 62 for communicating with the mass storage devices via the local bus 48. According to the various embodiments of the present invention, the local bus interface controller 62 may comprise a SCSI-compatible controller, an ATA-compatible controller, a serial-ATA controller, a fibre channel compatible controller or other types of local bus interface controllers known to those skilled in the art.

The circuit board 60 also contains a secondary interface controller 66. As described above, a connector 40 provides an external interface to the secondary interface controller 66. In this manner, any one of a number of external interfaces may be connected to the circuit board 60. According to the various embodiments of the present invention, the secondary interface controller 66 may be compatible for communications via the Internet small computer systems interface ("ISCSI"), the universal serial bus ("USB") interface, the IEEE-1394 interface (Firewire®), an Infiniband® interface, a fibre channel interface, a serial-ATA interface, a SCSI interface, or an Ethernet interface. Other types of external buses and networks may also be connected to the circuit board 60.

According to the various embodiments of the invention 60, a bridge component 64 is also provided on the circuit board 60 that is interposed between the local bus interface controller 62 and the secondary interface controller 66. The bridge component 64 bridges communications between the controller 62 and the controller 66 thereby providing an interface between the connector 40 and the local bus 48.

According to the various embodiments of the invention, the combination of the local bus interface controller 62, the secondary interface controller 66, and the bridge component 64 provide a bridge between an external bus and the local bus 48. For instance, according to one embodiment of the invention, the secondary interface controller 66 is compatible with a USB interface. According to the same embodiment of the invention, the local bus interface controller 62 is compatible with SCSI. In this manner, a computer or other device supporting the USB can utilize the computing device 38 to store data on storage devices 36 compatible with SCSI. Other similar configurations should be apparent to those skilled in the art.

Figure 6:
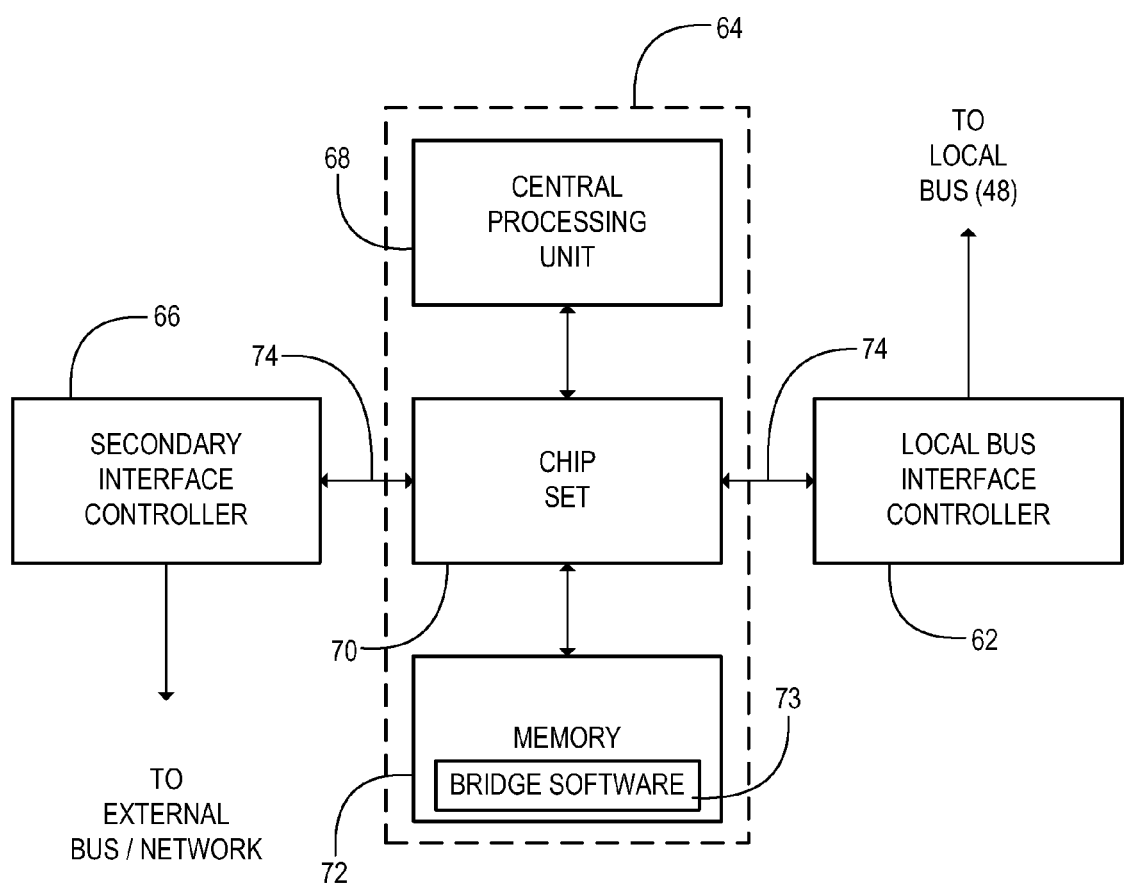
FIG. 6 is a computer architecture diagram showing one actual implementation for a computing device provided according to one embodiment of the present invention.

Referring now to FIG. 6, one illustrative architecture for the bridge component 64 will be described. As shown in FIG. 6, according to one embodiment of the invention, the bridge component 64 comprises a general purpose microprocessor, or central processing unit 68, a chip set 70, and a memory 72. As known to those skilled in the art, the chip set 70 controls the operation of the central processing 68 and the memory 72. Moreover, the chip set 70 provides an interface to a bus 74. According to one embodiment of the invention, the secondary interface controller 66 and the local bus interface controller each reside on the bus 74.

According to this embodiment of the invention, the memory 72 stores bridge software 73 for bridging the secondary interface controller 66 and the local bus interface controller 62. In particular, the bridge software 73 is operative to provide an interface between the secondary interface controller 66 and the local bus interface controller 62. In this manner, data communications requests and responses may be translated to allow storage and retrieval from the computing devices 38 on the local bus 48 from the external bus or network.

Figure 7:
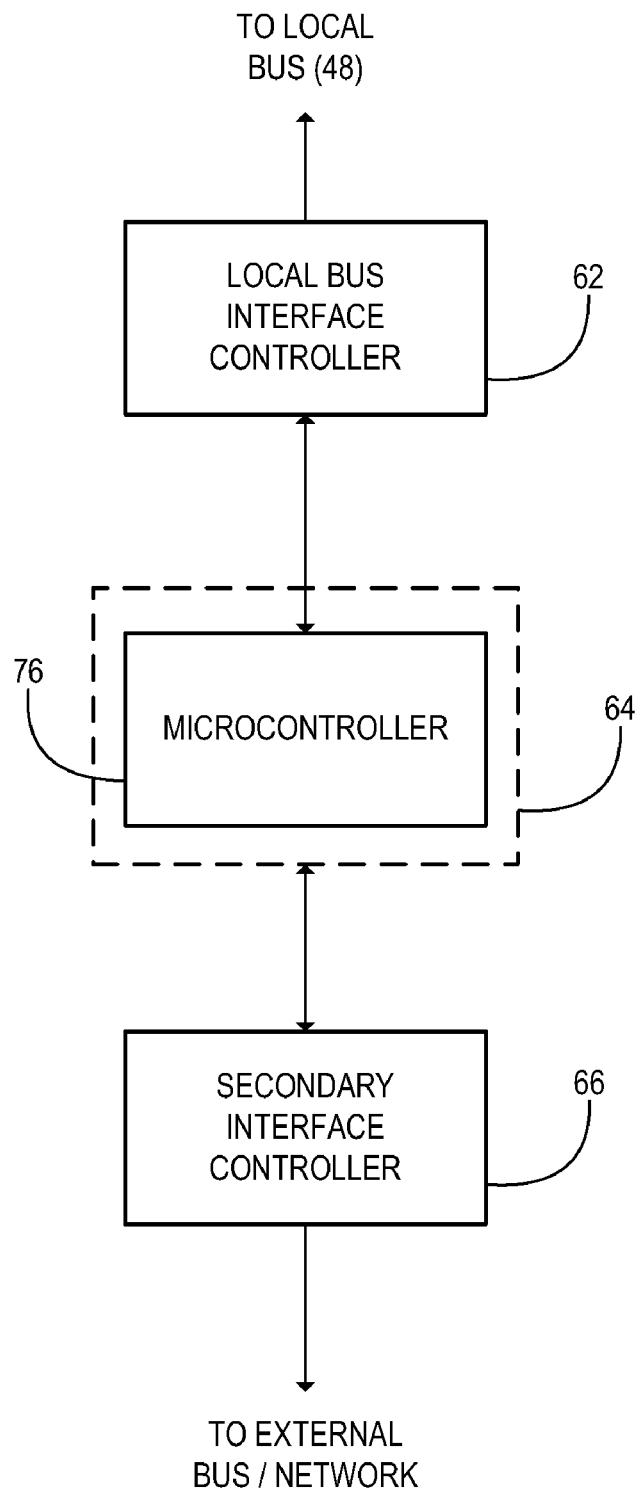
FIG. 7 is a computer architecture diagram showing another actual implementation for a computing device provided according to one embodiment of the present invention.

Referring now to FIG. 7, another illustrative architecture for the bridge component 64 will be described. As shown in FIG. 7, the bridge component 64 may comprise a microcontroller 76. In particular, the microcontroller 76 comprises a solid state device created for specifically providing a bridge between the local bus interface controller 62 and the secondary interface controller 66. In this manner, a dedicated controller may be provided for bridging the controllers 62 and 66.

Figure 8:
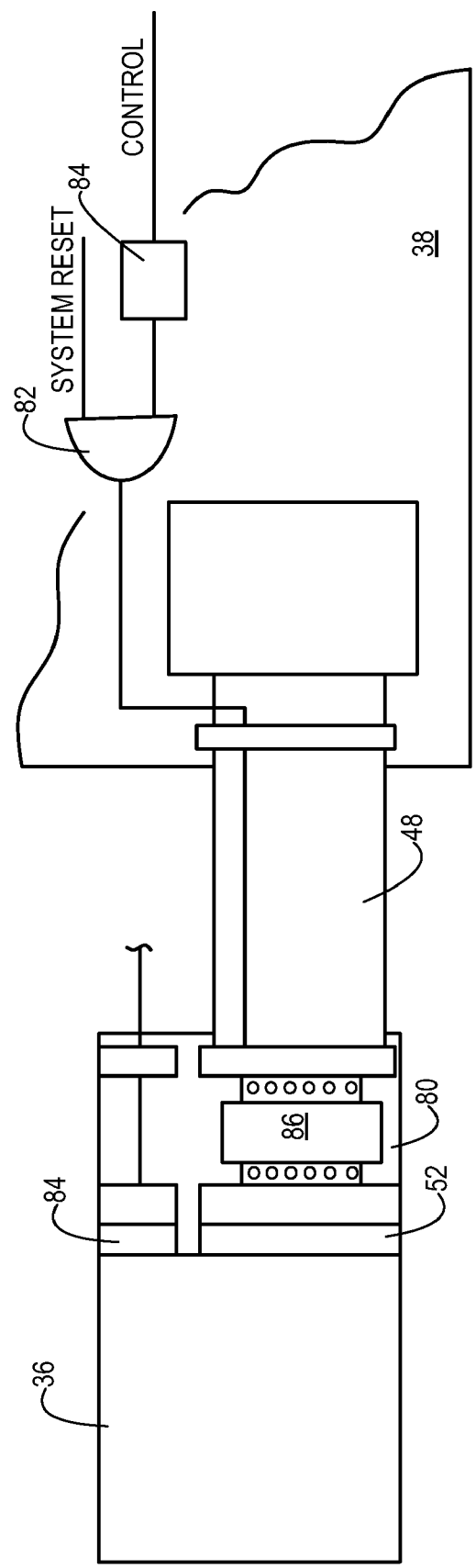
FIG. 8 is a schematic diagram showing the connections between a storage device and a computing device via an intermediate communications gateway according to one embodiment of the present invention.

Referring now to FIG. 8, a schematic illustrating the connection between a storage device 36 and a computing device 38 via an intermediate communications gateway 80 for controlling communications over the local bus 48 according to various embodiments is depicted. As described in detail in U.S. Pat. No. 7,007,109, the intermediate communications gateway 80 can establish electrical connection with the storage device 36 in a wide variety of manners including direct connection to the connector carried by hard disk drive, connection to the hard disk drive via an adapter, or via another cable or bus, if so desired. In any event, the intermediate communications gateway 80 is designed to communicate with the computing device 38 via the bus 48 and to separately or locally communicate with the storage device 36.

According to one embodiment, communication via the bus 48 with the storage device 36 may be suspended in order to transfer data via the bus 48 relating to the storage device 36. As such, the disclosure provided herein presents two different states of communication between the computing device 38 and the intermediate communications gateway 80, namely, a normal state in which data is transmitted between the storage device 36 and the computing device 38, and an isolation state in which communication with the storage device 36 is suspended and the storage device 36 is isolated from the bus 48. In order to define the state of communication between the computing device 38 and the intermediate communications gateway 80, the computing device 38 can control the state of at least one control line of the bus 48 such that communication with the storage device 36 is supported while the control line is in a first state and communication with the storage device 36 is suspended while the control line is in a second state. While various lines of the bus 48 may be utilized as the control line depending upon the type of storage device 36 and, correspondingly, the predefined functions of the various lines of the bus 48, the control line is preferably a line of the bus that may be accessed and controlled by the computing device 38.

With respect to one advantageous embodiment in which the storage device 36 is an IDE hard disk drive and the bus 48 is correspondingly an AT bus, the RESET line is preferably utilized as the control line for purposes of defining the state of communication between the computing device 38 and the storage device 36 since the RESET line is driven by the system reset signal provided by the computing device 38, while the remainder of the lines of the AT bus originate with the controller and would therefore be more difficult to access. Typically, the RESET line of the AT bus is utilized by the computing device 38 in order to reset the storage device 36, such as during the initial application of power or during or following a failure, a hang or a time out condition.

Various techniques may be utilized in order to access and drive the RESET line to define and control the state of communications between the computing device 38 and the storage device 36. In one embodiment provided by means of example but not of limitation, the system reset signal is no longer directly connected to the RESET line of the bus 48. Instead, the system reset signal is combined with a control signal generated by General Purpose Input/Output (GPIO) pins, often available from the chipset or a PCI-bridge that defines the state of communications between the computing device 38 and the storage device 36.

In the illustrated embodiment, for example, the control signal and the system reset signal are combined by an AND gate 82, with the output of the AND gate driving the RESET line of the bus 48. While the relative states of the system reset line may vary based upon the signaling convention of the computer, the system reset signal is typically maintained high since the system reset signal is high under normal conditions in which the storage device 36 is not to be reset and low only in instances in which the storage device 36 is to be reset. Thus, in normal conditions in which the system reset signal is high the state of the control line will dictate the output of the AND gate 82. In this regard, while the first and second states of the control line, i.e., the RESET line, may also be defined differently depending upon the signaling convention utilized by the computing device 38, the computing device 38 of one embodiment drives the control line and, in turn, the RESET line high in order to maintain normal communications between the computing device 38 and the storage device 36 and low in order to suspend communications with the storage device 36 and to isolate the storage device 36 from the bus 48. While one embodiment of a technique for controlling the RESET line of the bus 48 is depicted in FIG. 8, other techniques may be utilized without departing from the spirit and scope of the present disclosure.

The intermediate communications gateway 80 includes a logic circuit, a processing element such as a processor, or other electronics 86 for monitoring the state of the control line and, in the above-described embodiment, permits communication between the computing device 38 and the storage device 36 while the control line is high, but isolates the storage device 36 from the bus 48 while the control line is low. In this regard, while the control line is high, the intermediate communications gateway 80 transfers instructions and data received via the bus 48 from the computing device 38 to the storage device 36 and, conversely, transfers data received from the storage device 36 to the computing device 38 via the bus 48. Upon detecting that the control line has transitioned from the first state to the second state, such as by detecting a high to low transition in the above-described embodiment, however, the intermediate communications gateway 80 prevents the computing device 38 from communicating with the storage device 36 by isolating the storage device 36 from the bus 48. However, the intermediate communications gateway 80 does still support local communications between the intermediate communications gateway 80 and the storage device 36 while the storage device 36 is isolated from the bus 48. In addition, the intermediate communications gateway 80 continues to provide power received from the computer power supply to the storage device 36 while the storage device 36 is isolated from the bus 48, via a power connection 84.

While the storage device 36 is isolated from the bus 48, the computing device 38 and the intermediate communications gateway 80 can communicate data relating to the storage device 36 via the bus 48. The computing device 38 and the intermediate communications gateway 80 communicate a wide variety of data. This data may be transmitted via any line of the bus other than the line(s) utilized for control. Typically, however, the chip select, address and data lines of the bus are utilized for the transmission of data relating to the storage device 36 between the computing device 38 and the intermediate communications gateway 80. By way of one example of the type of data relating to the storage device 36 that may be communicated between the computing device 38 and the intermediate communications gateway 80, the computing device 38 may provide control signals to the intermediate communications gateway 80 directing some activity on the part of the storage device 36.

In this example, the intermediate communications gateway 80 receives the control signals from the computing device 38 and, in turn, provides appropriate instructions to the storage device 36 via the local communications link maintained therebetween. While the computing device 38 can transmit various types of control signals, examples of the control signals include power control signals for enabling the power to the storage device 36, alarm signals for indicating a storage device failure and visual indicator signals directing the storage device 36 to provide visual indicators indicating failure, presence and/or activity. In addition to the transmission of control signals from the computing device 38 to the intermediate communications gateway 80, the intermediate communications gateway can provide status signals to the computing device 38 while the storage device 36 is isolated from the bus

48. Typically, the status signals are provided in response to a query from the host regarding the status of the storage device 36. In this regard, the status signals can include the drive present signal indicating the presence or absence of a storage device 36, a failure signal indicating if the storage device 36 has experienced a failure, an audible alarm signal indicating if the storage device 36 has a failure by sound, a visual indicator status signal indicating if the storage device 36 is currently providing a visual indication of either failure or activity, a temperature signal indicating the temperature of the air surrounding the storage device 36, and an operational state signal indicating the current operational state of the storage device 36.

While the intermediate communications gateway 80 may be configured in a number of different manners, the intermediate communications gateway 80 typically includes a plurality of registers for storing status information relating to the storage device 36. The status information includes, among other status conditions, the storage device presence status, the failure status, the alarm status, the visual indicator status, the temperature status and the operational state status. As such, in response to a query from the computing device 38, the intermediate communications gateway 80 may provide the requested status by polling the contents of the appropriate register and transmitting the contents of the appropriate register to the computing device 38 via the bus 48. Additionally, the intermediate communications gateway 80 can include registers for storing the control signals received from the computing device 38. As such, the intermediate communications gateway 80 can subsequently provide appropriate instructions to the storage device 36 in accordance with the control signals transmitted by the computing device 38 based upon the contents of the registers of the intermediate communications gateway 80.

Based on the foregoing, it should be appreciated that various embodiments of the present invention provide an apparatus for bridging two or more data communications interfaces. The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for providing a bridge between two or more data communications interfaces, the apparatus comprising:
    a plurality of device bays, each device bay configured according to a common form factor and comprising an internal mass storage communications interface communicatively linked to the plurality of device bays via a bus having a control line and operative to interchangeably mate with a connector of a storage device and a connector of a computing device;
    the computing device for use within one device bay of the plurality of device bays, the computing device comprising
        a first controller for enabling communications with each of the plurality of device bays via the internal mass storage communications interface,
        a second controller for enabling communications between the plurality of device bays and an external source via an external mass storage communications interface, and
        a bridging component between the internal mass storage communications interface and the external mass storage communications interface, the bridging component comprising a memory and a processor operative to
            execute bridging software stored in the memory for translating requests from the external source via the external mass storage communications interface, receiving responses from the storage device via the internal mass storage communications interface, and for translating the responses received via the internal mass storage communications interface, and to
            control a state of the control line of the bus such that the communications with the storage device in a first device bay of the plurality of device bays is supported while the control line is in a first state and suspended while the control line is in a second state; and
        an intermediate communications gateway responsive to the state of the control line in order to permit communication between the computing device and the storage device in the first device bay while the control line is in the first state and to isolate the storage device from the bus while the control line is in the second state,
    wherein the computing device and the intermediate communications gateway are operative to communicate data relating to the storage device in the first device bay while the control line is in the second state and wherein the intermediate communications gateway is operative to establish communication with the storage device in the first device bay while the control line is in the second state and while the storage devices is isolated from the bus in order to retrieve the data relating to the storage device for communication via the bus to the computing device.

2. The apparatus of claim 1, wherein the form factor comprises a three and one-half inch form factor, a two and one-half inch form factor, or a one and one-half inch form factor.

3. The apparatus of claim 1, wherein each of the plurality of device bays is configured to receive power from the bus while a storage device within the device bay is isolated from the bus to provide for hot swapping of the storage device.

4. The apparatus of claim 3, wherein the internal mass storage communications interface comprises a small computer systems interface and wherein the external mass storage communications interface comprises an internet small computer systems interface.

5. The apparatus of claim 3, wherein the internal mass storage communications interface comprises a small computer systems interface and wherein the external mass storage communications interface comprises a universal serial bus interface.

6. The apparatus of claim 3, wherein the internal mass storage communications interface comprises a fibre channel interface and wherein the external mass storage communications interface comprises a universal serial bus interface.

7. The apparatus of claim 3, wherein the internal mass storage communications interface comprises an integrated drive electronics interface and wherein the external mass storage communications interface comprises an IEEE-1394 interface.

8. The apparatus of claim 3, wherein the internal mass storage communications interface comprises a small computer systems interface and wherein the external mass storage communications interface comprises an Infiniband® interface.

9. The apparatus of claim 3, wherein the computing device further comprises a first connector for connecting to the internal mass storage communications interface and a second connector for connecting to the external mass storage communications interface, the first and second connectors positioned on opposite sides of the computing device and configured so that the second connector is exposed when the computing device is installed in the one device bay of the plurality of device bays.

10. A bridge apparatus, comprising:
a rack mount powered enclosure comprising one or more bays, each of the bays operative to interchangeably receive and power a storage device and a server computer of an identical form factor, a backplane comprising an internal mass storage communications interface and a power interface in each of the bays, a local bus having a control line connecting each internal mass storage communications interface located in each bay, an intermediate communications gateway responsive to a state of the control line in order to permit communication between the one or more device bays and the server computer while the control line is in a first state and to isolate a storage device within a device bay from the bus while the control line is in a second state, and a power supply for providing power to each power interface located in each bay; and
the server computer for use within the rack mount powered enclosure, the server computer comprising a local bus interface controller and a server computer mass storage communications interface for communicating over the bus with the internal mass storage communications interface in each bay, a secondary interface controller for communicating with an external bus or an external network via a connector positioned on an opposite side of the server computer from the server computer mass storage communications interface and proximate to a front surface of the rack mount powered enclosure when the server computer is installed in the rack mount powered enclosure, and a dedicated bridge component between the local bus and the external bus or external network, the dedicated bridge component comprising a processor operative to execute bridging software for translating requests, receiving responses, and translating the received responses between the internal mass storage interface and the connector, and operative to control the state of the control line of the bus,
wherein the server computer and the intermediate communications gateway are operative to communicate data relating to a storage device in a first device bay while the control line is in the second state and wherein the intermediate communications gateway is operative to establish communication with the storage device in the first device bay while the control line is in the second state and while the storage devices is isolated from the bus in order to retrieve the data relating to the storage device for communication via the bus to the server computer.

11. The apparatus of claim 10, wherein the local bus comprises one of either a small computer systems interface, a fibre channel interface, an advanced technology attachment interface, or a serial advanced technology attachment interface.

12. The apparatus of claim 11, wherein the external bus or external network comprises one of either a universal serial bus interface, an IEEE-1394 interface, an Ethernet interface, a serial advanced technology attachment interface, or a fibre channel interface.

13. The apparatus of claim 11, wherein the external bus or external network comprises an internet small computer systems interface or an Infiniband® interface.

14. The apparatus of claim 10, wherein the one or more bays are sized according to a one and one-half inch, two and one-half inch, or three and one-half inch form factor.

15. A bridge apparatus, comprising:
a powered enclosure sized to be rack mounted in a standard rack mount cabinet, the powered enclosure characterized by
a plurality of bays, each of the bays operative to interchangeably receive and power a storage device and a server computer of an identical form factor,
a backplane comprising identical mass storage connectors in each of the plurality of bays for mating each storage device and server computer to a local bus having a control line,
a front surface having apertures corresponding to the plurality of bays,
a power supply for providing power to each storage device and server computer, and
an intermediate communications gateway responsive to a state of the control line in order to permit communication between one or more server computers and the plurality of bays while the control line is in a first state and to isolate a device within a device bay from the bus while the control line is in a second state; and
one or more server computers for use within the enclosure, each server computer characterized by
a rear side adjacent to the backplane of the powered enclosure when the server computer is installed in one bay of the plurality of bays,
a front side adjacent to the front surface of the powered enclosure when the server computer is installed in the one bay of the plurality of bays,
a mass storage communications interface positioned on the rear side of the server computer configured for mating with one of the mass storage connectors,
a local bus interface controller for receiving data over the local bus via the mass storage communications interface positioned on the rear side of the server computer,
a secondary interface controller for communicating with an external network via a network connector positioned on the front side of the server computer, and
a dedicated bridge component between the local bus and the external network, the dedicated bridge component comprising a processor operative to execute bridging software for translating requests for data, receiving the requested data from a storage device, and translating the data between the mass storage communications interface and the network connector, and operative to control the state of the control line of the bus,
wherein the one or more server computers and the intermediate communications gateway are operative to communicate data relating to a storage device in a first device bay while the control line is in the second state and wherein the intermediate communications gateway is operative to establish communication with the storage device in the first device bay while the control line is in the second state and while the storage devices is isolated from the bus in order to retrieve the data relating to the storage device for communication via the bus to the one or more server computers.

* * * * *